Oct. 24, 1939.  C. A. BARKER  2,177,425
PROCESS FOR STOPPING RUNS IN KNITTED WEAR
Filed June 16, 1937  2 Sheets—Sheet 1

Charles A. Barker,
INVENTOR
BY Victor J. Evans & Co.
ATTORNEYS

Oct. 24, 1939.    C. A. BARKER    2,177,425
PROCESS FOR STOPPING RUNS IN KNITTED WEAR
Filed June 16, 1937    2 Sheets-Sheet 2

Charles A. Barker,
INVENTOR
BY Victor J. Evans & Co.
ATTORNEYS

Patented Oct. 24, 1939

2,177,425

UNITED STATES PATENT OFFICE 2,177,425

PROCESS FOR STOPPING RUNS IN KNITTED WEAR

Charles A. Barker, Highland Park, N. J.

Application June 16, 1937, Serial No. 148,566

1 Claim. (Cl. 91—67.9)

This invention relates to knitted articles such as stockings, underwear and other apparel made of knit web and to a method of treatment which will increase their durability and, at the same time, permit decorative treatment for purposes of trade-marking or the enhancement of appearance.

Knitted wear, because of its flexibility, is most suitable for form fitting garments but, because of the ordinary filament structure of knitted fabrics consist of a system of interlocking loops, the rupture of any of the threads of the knitted structure causes the tension on adjacent loops to release and the loops to straighten out. This release of tension is progressive from loop to loop and course to course and will progress as far as the lateral or longitudinal strain on the structure persists. These "runs" in knitted wear and in the case of stockings in particular, may extend through the whole length of the garment and are a constant cause of expense and embarrassment. There has been an insistent demand for some method to control this defect because most, if not all, of these knitted garments are provided with attached straps or are used in conjunction with attached garters, pins, clasps, etc., and these essential and obligatory auxiliaries are the chief causes of the trouble because the strain on the braid is usually at the point where they are attached or in the near vicinity.

The so-called "runs" in stockings generally originate at the point where garters are attached and with knitted undergarments, just below the point where the shoulder straps are attached. Manufacturers of knitted wear provide the knitted garments, such as stockings and slips, with a hem, sometimes, with an interposed weave of closer mesh or special form. This hem is utilized for the attachment of straps, pins, clasps, garters, etc., with the expectation that the doubled fabric in this area would better withstand the localized strain of these attachments. This hem has proved to be ineffective and, therefore, in some instances a special weave is interposed between this hem and the main body of the garment so as to impede further progress of "runs" originating in the area of the hem, through tension or by rupture of filaments by the sewing operation in the making of the weave.

This interposed hem is also ineffective because some of the threads of the structure carry on straight through this interposed weave and "runs" beginning in the hem progress along these filaments—through the special weave—into the main body of the garment.

Consideration must be given, in any method for stopping or checking this defect, to the fact that the foldability and flexibility of the garment shall not be impaired. Also, that the appearance of the garment shall not be marred so as to detract from its selling appeal.

The principal object of this invention is to provide a band, design, symbol or the like of a film-forming or cohesive substance or composition such as an oleoresinous varnish, a synthetic resin composition, a soluble cotton lacquer, a rubber compound or other suitable material around the stocking or across the fabric in such a manner as to bind each filament of the braid, or such filaments as may later be under stress, in such a way as to prevent the "run" from extending beyond this band, design, symbol or the like.

A variation of this method of laying a band, design, or symbol around the stocking or across the fabric is the utilization of the fact that some braided garments are composed wholly or in part of yarns which are soluble in the same solvents as are used in certain types of soluble cotton lacquers. Therefore, the bonding, by coalesence, of adjoining filaments in the band, design or symbol of the construction described hereinafter, may be attained by incorporating solvents of a suitable type in the binding solution or in some circumstances by the use of solvent action alone and laying, painting, spraying or impressing this solvent bearing solution or the solvent on the fabric for sufficient time to soften the soluble filaments so that contiguous filaments will adhere to each other at spaced points are described hereinafter.

Another variation of this method is to utilize the fact that some braided fabrics are composed wholly or in part of yarns which are thermoplastic and therefore coalescence of contiguous filaments in the spaced points as described hereinafter may be attained by the impressment of heated dies, or rolls of suitable design either in conjunction with binding solutions or compounds or by fusion by heat alone.

Another prime object of this invention is to lay this filament binder or this system of fused filaments in such a manner as to permit the garment to stretch, expand or be folded as required.

Another object of this invention is to provide this filament binder in such a manner as to be decorative by the incorporation of dyes or pigments in the filament binder or the use of colors in conjunction with heat in the fusion of thermoplastic filaments of the fabric.

Another object of this invention is to provide this filament binder in such a manner as to be distinctive or both distinctive and decorative so that the manufacturer of the garment, the grade, etc., may be indicated by color, design, lettering, etc.

This distinctive and decorative effect may be attained by the use of a thermoplastic material which is pigmented and which is used in conjunction with heated dies or rolls so that under pressure, a colored marking can be applied to the fabric at the same time as heat by fusion is developed between contiguous filaments.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1:
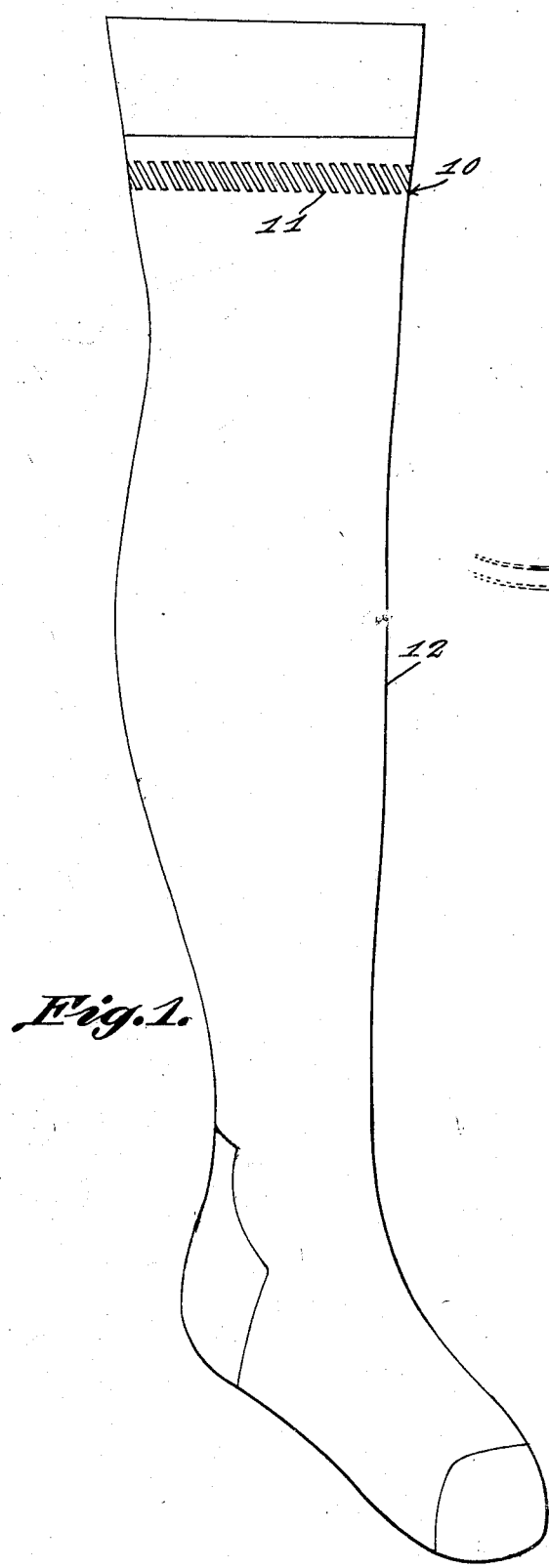
Figure 1 is a side elevation of a stocking constructed in accordance with the invention.

Referring now to the drawings in which like characters of reference designate similar parts in the various views, one embodiment of the invention consists in forming a band 10 of separated overlapping characters 11 around a stocking 12, or across form-fitting knitted fabric at a distance spaced from the edge of the fabric. The band may be provided by laying, painting, spraying, or impressing a soluble cotton, resinous, oleoresinous solution, or a plastic or thermoplastic compound in overlapping spaced and preferably canted, although not necessarily so, relationship, to bond or impregnate contiguous threads of the material at a plurality of points within the area of the band.

Figure 4:
Figure 4 is a diagrammatic view showing various discontinuous, interlocking, staggered, parallel lines, figures and designs arranged so that every filament is flexibly bonded in accordance with the invention.
Figure 4:
Figure 4:
Figure 4:
Figure 4:
Figure 4:
Figure 4:
Figure 4:
Figure 4:
Figure 4:
Figure 4:
Figure 4:
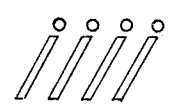
Figure 4:
Figure 4:
Figure 4:
Figure 4:
Figure 4:
Figure 4:
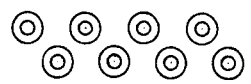
Figure 4:
Figure 4:
Figure 4:
Figure 4:
Figure 4:
Figure 4:
Figure 4:
Figure 4:
Figure 4:
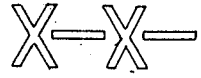
Figure 4:

Another embodiment of the invention consists in laying a binding medium on fabric, the medium being composed of discontinuous, interlocking, staggered, or parallel lines denoting alphabetical letters as indicated below the first line of characters in Figure 4, or consisting of symmetrical overlapping disconnected and spaced characters of any kind, as indicated in the first row of Figure 4. The binding medium may be any of the above mentioned mediums applied in the manner above stated or by means of a heated dye, roll or other suitable device.

Flexibility or foldability exists in the knitted garment, of whatever type it may be, by virtue of the untreated interstices in the discontinuous band, and the degree of this foldability or flexibility would be controlled by the width of the untreated interstices, and to some degree by the flexible binding medium used in the band, design, symbol, or the like.

Stretching of the garment under this process is caused by a movement of the bound filaments from a vertical position to a more or less horizontal position by axial action from the points at which they are held by the binding medium.

Figure 2:
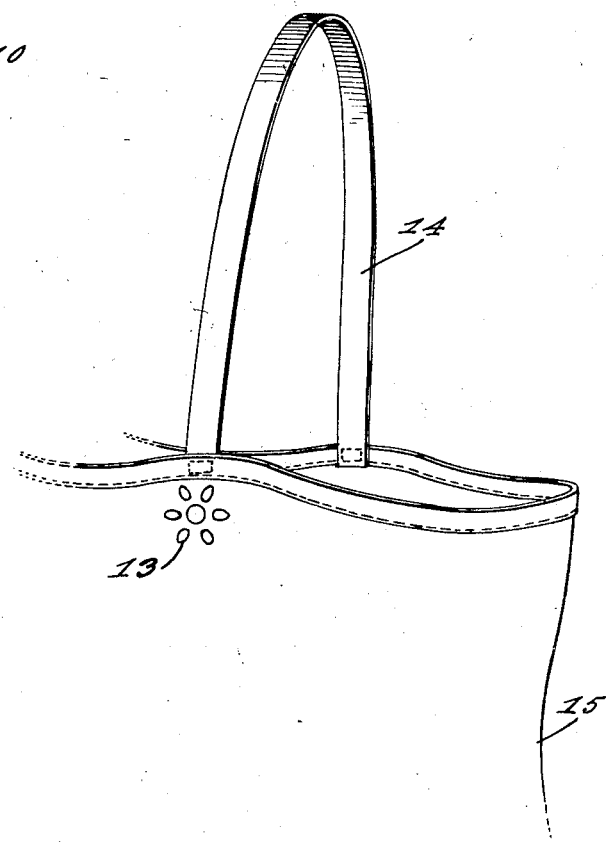
Figure 2 is a fragmentary front elevation of a slip constructed in accordance with the invention.

As shown in Figure 2, an embodiment of the invention may consist of a simple design such as a flower 13 under the strap 14 of a slip 15.

Figure 3:
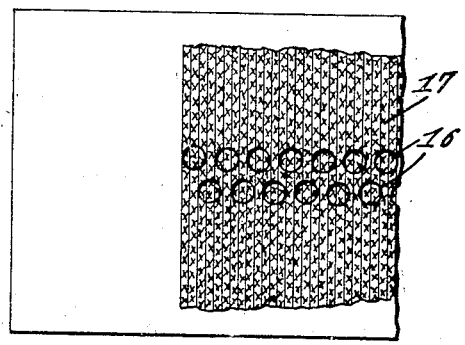
Figure 3 is a diagrammatic view of a piece of knitted fabric constructed in accordance with the invention.

The design may even consist of dots 16 of substantial area arranged in rows, the dots of each row being staggered with respect to the next adjacent row, on the knitted material 17 of any type, which is depicted in Figure 3, showing the filaments of the weave.

Another modification of the invention consists of providing a decorative band, design, symbol or the like by laying, painting, spraying, or impressing a dyed or pigmented colored soluble cotton, resinous, oleoresinous varnish, soluble cotton lacquer, rubber compound, or other suitable binding medium, on the knitted form-fitting fabric.

A further modification, used in connection with cellulose acetate or other soluble yarns consists in forming the characters as above described around the stocking or across the fabric by laying, painting, spraying or impressing a solvent bearing solution of sufficient strength and in sufficient duration to soften the soluble fabric so that contiguous threads or filaments will cling to each other at spaced points.

A further modification used in connection with knitted fabrics formed of cellulose acetate or other thermo-plastic yarns consists of forming the discontinuous band, design, symbol, or the like by partial fusion of the yarn and consequent adhesion of filaments in contact with each other in the presence of a heated die, roll or other suitable device.

What is claimed is:

A process for preventing or checking runs in knitted wear composed wholly or in part of thermoplastic yarns, including the step of applying heat at areas to form overlapping staggered spaced characters through the medium of which contiguous filaments of the knitted wear are put in partial solution and coalesced thereby forming a discontinuous band of untreated and treated areas at spaced points in the knitted wear.

CHARLES A. BARKER.